United States Patent
Sakurai

[19]
[11] Patent Number: 5,917,507
[45] Date of Patent: *Jun. 29, 1999

[54] OUTPUT APPARATUS AND METHOD CAPABLE OF OUTPUTTING INFORMATION IN RESPONSE TO INSTRUCTIONS FOR DATA SOURCE

[75] Inventor: Masakatsu Sakurai, Yokohama, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/908,155

[22] Filed: Aug. 7, 1997

Related U.S. Application Data

[63] Continuation of application No. 08/400,381, Mar. 3, 1995, abandoned, which is a continuation of application No. 08/079,837, Jun. 22, 1993, abandoned, which is a continuation of application No. 07/803,907, Dec. 9, 1991, abandoned, which is a continuation of application No. 07/341,751, Apr. 21, 1989, abandoned.

[30] Foreign Application Priority Data

Apr. 22, 1988 [JP] Japan .................................. 63-98332
Aug. 30, 1988 [JP] Japan ................................ 63-217205

[51] Int. Cl.⁶ .................................................. G06F 13/00
[52] U.S. Cl. .......................... 345/526; 345/192; 345/467; 345/509; 395/110
[58] Field of Search ..................................... 345/501, 526, 345/509, 522, 194, 195, 192, 467, 471, 141; 395/110, 101

[56] References Cited

U.S. PATENT DOCUMENTS

| | | | |
|---|---|---|---|
| 4,156,915 | 5/1979 | Hasenbalg et al. | 395/150 |
| 4,251,871 | 2/1981 | Yu | 395/150 |
| 4,439,761 | 3/1984 | Fleming et al. | 340/735 |
| 4,580,242 | 4/1986 | Suzuki et al. | 340/735 X |
| 4,686,525 | 8/1987 | Nagata | 340/790 |
| 4,737,779 | 4/1988 | Somigli et al. | 340/790 X |
| 4,745,561 | 5/1988 | Hirosawa et al. | 340/751 X |
| 4,779,105 | 10/1988 | Thomson et al. | 364/518 X |
| 4,928,243 | 5/1990 | Hodges et al. | 364/519 |
| 5,018,078 | 5/1991 | Urabe et al. | 395/150 |

*Primary Examiner*—Kee M. Tung
*Attorney, Agent, or Firm*—Fitzpatrick, Cella Harper & Scinto

[57] ABSTRACT

There is disclosed an output apparatus such as a printing apparatus or a display apparatus capable of exhibiting sufficient performance even when the output apparatus and the data source do not have the same bit map character font. The output apparatus has a memory for storing bit map character fonts, a detector for detecting the bit map character font designated by the data source and a transmitter, whereby the bit map character pattern is sent to the data source according to the detected bit map or font.

47 Claims, 6 Drawing Sheets

OUTPUT APPARATUS AND METHOD CAPABLE OF OUTPUTTING INFORMATION IN RESPONSE TO INSTRUCTIONS FOR DATA SOURCE

This application is a continuation of application Ser. No. 08/400,381, filed Mar. 3, 1995, which is a continuation of application Ser. No. 08/079,837, filed Jun. 22, 1993, which is a continuation of application Ser. No. 07/803,907, filed Dec. 9, 1991, which is a continuation of application Ser. No. 07/341,751, filed Apr. 21, 1989, now all abandoned.

BACKGROUND OF THE INVENTION

1. Field of the Invention

The present invention relates to a display apparatus in the form of a cathode ray tube, or an output apparatus such as a printing apparatus

2. Related Background Art

In the conventional information output apparatus, the bit map character patterns are used only for the information output of said output apparatus.

However, in such conventional system, a same bit map character font has to be provided both in the output apparatus and the data sources and both cannot function satisfactorily if this condition is not satisfied in either apparatus.

It is also conceivable to utilize the vector character font of the printing apparatus for generating bit map patterns for the purpose of printing character patterns.

However, in order to achieve a printing operation based on data from the data source, a same bit map character font has to be provided in the printing apparatus and in the data source, and both cannot function satisfactorily if this condition is not satisfied in either apparatus.

Otherwise a same vector character font and a same bit map character pattern generating system has to be provided in the printing apparatus and in the data source, and both cannot function satisfactorily if this condition is not satisfied in either apparatus

SUMMARY OF THE INVENTION

An object of the present invention is to provide an output apparatus capable of satisfactorily functioning even when a same bit map character font is provided in the output apparatus and in the data source.

Another object of the present invention is to provide an output apparatus for information output in response to instructions received from a data source through a bidirectional communication channel provided with memory means for storing bit map character font, detection means for detecting a bit map character font designated by the data source, and transmission means for sending bit map character patterns, prepared according to the bit map or font detected according to the designation of the data source.

Still another object of the present invention is to provide an output apparatus capable of bidirectional communication, provided with a function for detecting vector characters corresponding to character codes requested by the data source and transmitting said characters to the data source, whereby the data source can manage the characters to be printed by the output apparatus even if the data source does not have the vector character data provided in the output apparatus.

Still another object of the present invention is to provide an output apparatus capable of bidirectional communication with a function to generate characters of a resolution and a size requested by the data source and to send said characters to said data source, whereby the characters to be generated by the output apparatus can be released on an entirely different apparatus, even if a same vector character font or a same bit map character pattern generating system is not provided in the data source and in the output apparatus.

DETAILED DESCRIPTION OF THE PREFERRED EMBODIMENTS

Now the present invention will be explained in detail by embodiments thereof shown in the attached drawings.

Figure 1:
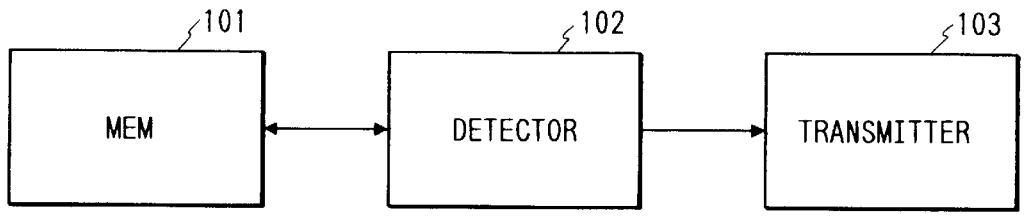
FIG. 1 is a block diagram showing the basic structure of an information output apparatus of the present invention.

The information output apparatus of the present invention capable of information output in response to instructions received from a data source through a bidirectional communication channel is characterized, as shown in FIG. 1, by the presence of memory means 101 for storing bit map character fonts; detection means 102 for detecting a bit map character font designated by said data source; and transmission means 103 for transmitting, to said data source, bit map character patterns according to thus detected bit map or font.

Figure 2:
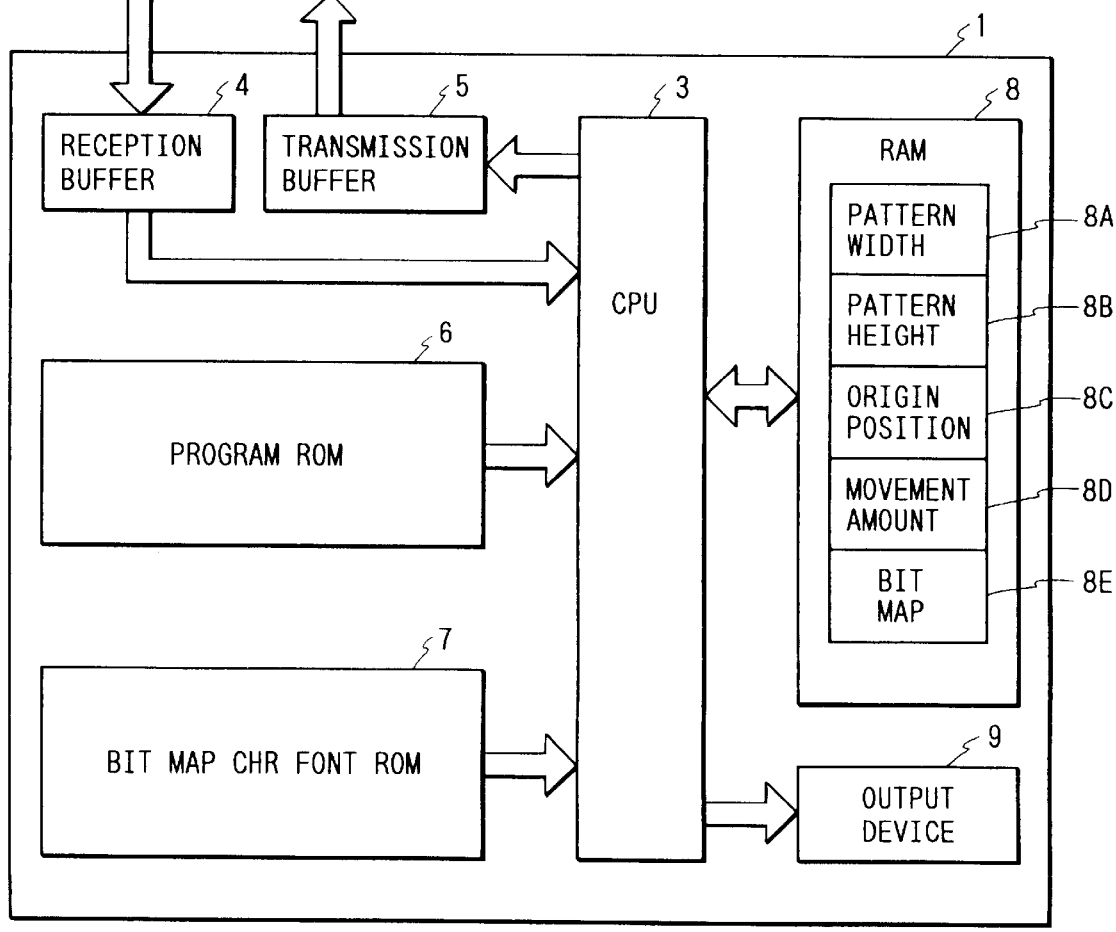
FIG. 2 is a block diagram showing an embodiment of the present invention.

FIG. 2 shows the structure of an embodiment of the present invention, wherein shown are a main body 1 of the printing apparatus; a data source 2 such as an external host computer; a CPU (central processing unit) 3 for controlling the entire printing apparatus 1; a reception buffer 4 for temporarily storing the data transmitted from the data source 2; and a transmission buffer 5 for temporarily storing the data to be transmitted from the printing apparatus 1 to the data source 20

Figure 4:
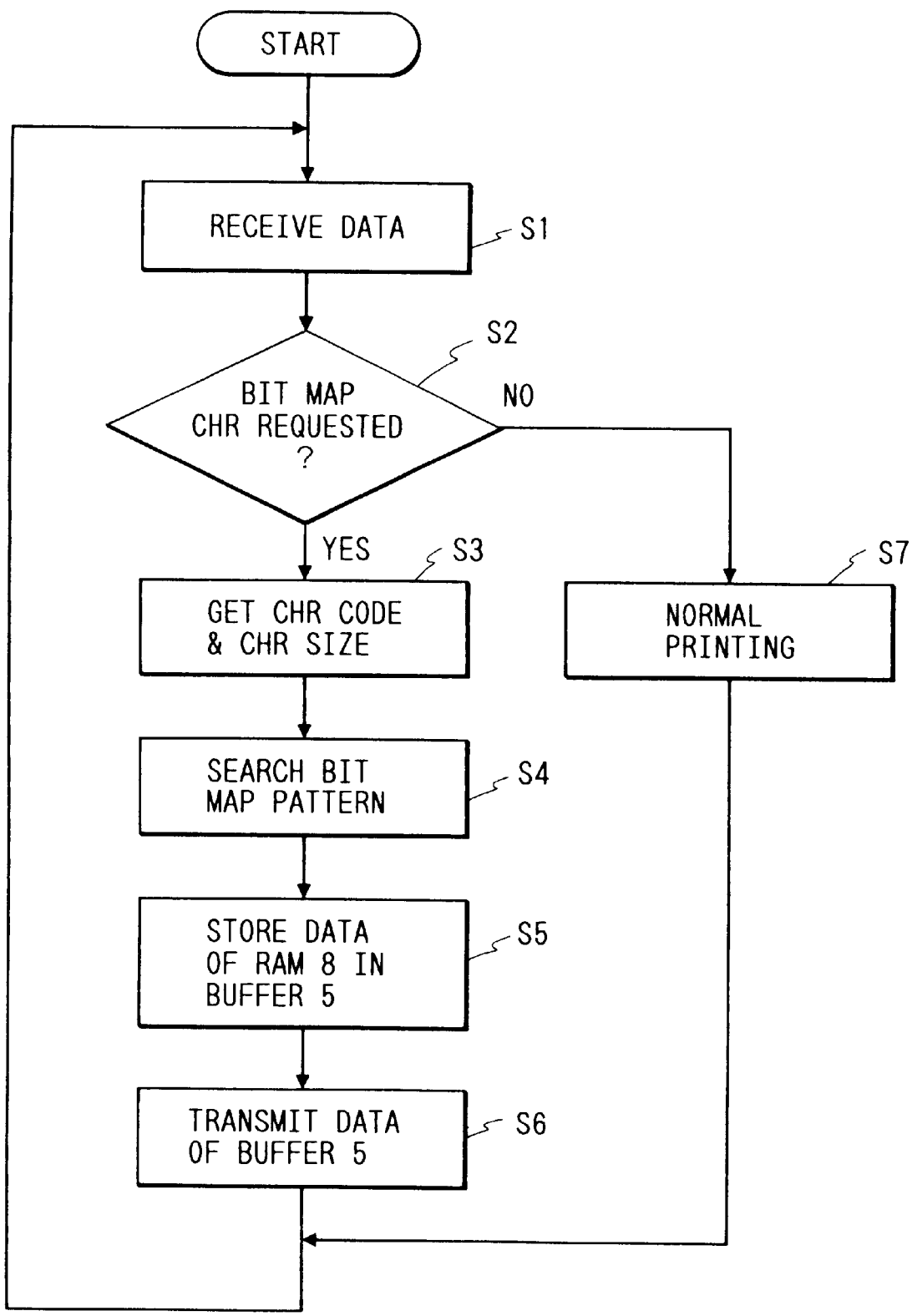
FIG. 4 is a flow chart of the control sequence of said embodiment.

A program ROM (read-only memory) 6 stores a control program corresponding to the flow chart shown in FIG. 4. The program stored in said program ROM 6 selects, from plural bit map character fonts stored in the ROM 7, a font of a size equal to or closest to the designated size, and detects a bit map pattern corresponding to the designated character code in said font, the original point of said pattern and the amount of character movement, indicating the distance to the original point of a next character.

The bit map character font ROM 7 stores bit map character patterns of various sizes corresponding to the character codes entered into the reception buffer 4, original points of characters and amounts of movement of characters.

An RAM (random access memory) 8 is used as a work area for program execution of the CPU 3, and is provided with a pattern width memory area 8A for storing the width of the bit map character pattern; a pattern height memory area 8B for storing the height of the bit map character pattern; an original point memory area 8C for storing the position of original point of the bit map character pattern; a movement amount memory area 8D for storing the amount of character movement of the bit map character pattern; and a bit map area 8E for storing the bit map character pattern, all for the data to be transmitted to the data source 2.

An output unit 9 serves to print the print data stored in the RAM 8.

Figure 3A:
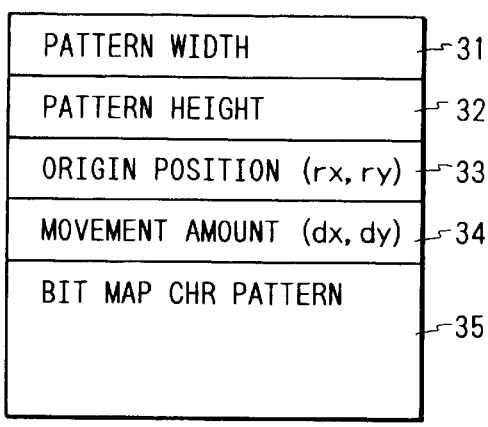
FIGS. 3A and 3B are views showing a transmission format of the bit map character pattern in said embodiment.
Figure 3B:
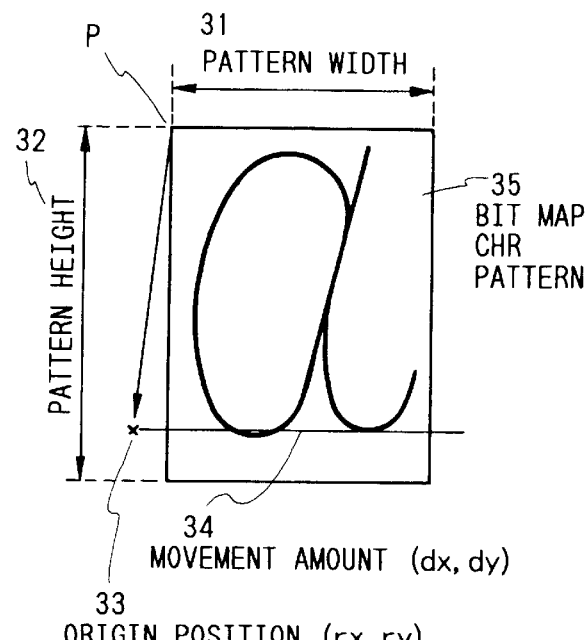

FIGS. 3A and 3B show the transmission format of the bit map character pattern in the present embodiment.

FIG. 3A shows a format adapted in the transmission of the bit map character data from the transmission buffer 5 of the printing apparatus 1 to the data source 2, while FIG. 3B shows specifically the data shown in FIG. 3A.

In FIGS. 3A and 3B, there are shown data 31 indicating the width of the bit map character pattern; data 32 similarly indicating the height; data 33 indicating the original point of character, or relative coordinate values ($r_x$, $r_y$) with respect to a position P (in a character displaying apparatus such as a printing apparatus, a character is displayed by bringing the original point 33 of the character to the current position); an amount 34 of character movement ($d_x$, $d_y$) indicating the amount of movement of current position after character display; and a bit map character pattern 35.

FIG. 4 is a flow chart of the control sequence of the printing apparatus of the present embodiment, and the function of said embodiment will be explained in the following with reference to said flow chart.

At the start of power supply to the main body 1 of the printing apparatus, a step S1 receives the data from the data source 2, stores said data in the reception buffer 4 and reads data of a unit code from the reception buffer 4. Then a step S2 discriminates whether the data received in the step S1 are a bit map character request code.

If the discrimination in the step S2 turns out negative, the sequence proceeds to a step S7. On the other hand, if said discrimination turns out affirmative, the sequence proceeds to a step S3 for further receiving a character code and data on the character size from the reception buffer 4. Then a step S4 selects, from the bit map character font ROM 7, a bit map character font of size equal or closest to the received character size, then detects a bit map pattern corresponding to the designated character code from said font and stores said pattern in the bit map area 8E. Also the width and height of the bit map pattern are stored in the pattern width memory area 8A and the pattern height memory area 8B, respectively. Furthermore the original point of the character and the amount of character movement are determined and stored respectively in the original point memory area 8C and the movement amount memory area 8D.

Then a step S5 stores the data in the RAM 8 into the transmission buffer 5, according to the transmission format for the bit map character, shown in FIG. 3A. Subsequently a step S6 executes the transmission of the transmission buffer 5 to the data source 2, and, after the transmission, the sequence returns to the step S1.

If the discrimination of the step S2 turns out negative, the step S7 executes ordinary process (character printing, line feed or form feeding) and the sequence returns to the step S1.

Though the foregoing description has been limited to a printing apparatus such as a page printers the present embodiment is easily applicable to any character display apparatus provided with a bidirectional communication channel and capaple of displaying characters with a bit map character font, including such display as cathode ray tube.

In the embodiment explained above, the printing apparatus, provided with plural bit map character fonts and capable of character printing by selecting a bit map character font of a size matching the designated character size, is given a function of detecting a bit map character font of the character size best matching the request from the host apparatus and transmitting the bit map patterns of said font to the host apparatus, so that information output is rendered possible with the characters from an identical data source, even in entirely different apparatuses.

In the following there will be explained another embodiment of the present invention, while making reference to the attached drawings. The present embodiment will be explained by an application in a printing apparatus such as a page printer, as an example of an output apparatus. In the vector character font employed in the present invention, the character or pattern is represented not by dot signals but by data of the outline points, and there are stored a train of coordinates of such points with or without the concept of spline curve. Thus said font is also called outline font or vector font. This is naturally applicable to the foregoing embodiment.

(Example of transmission of vector character data to the data source)

Figure 5:
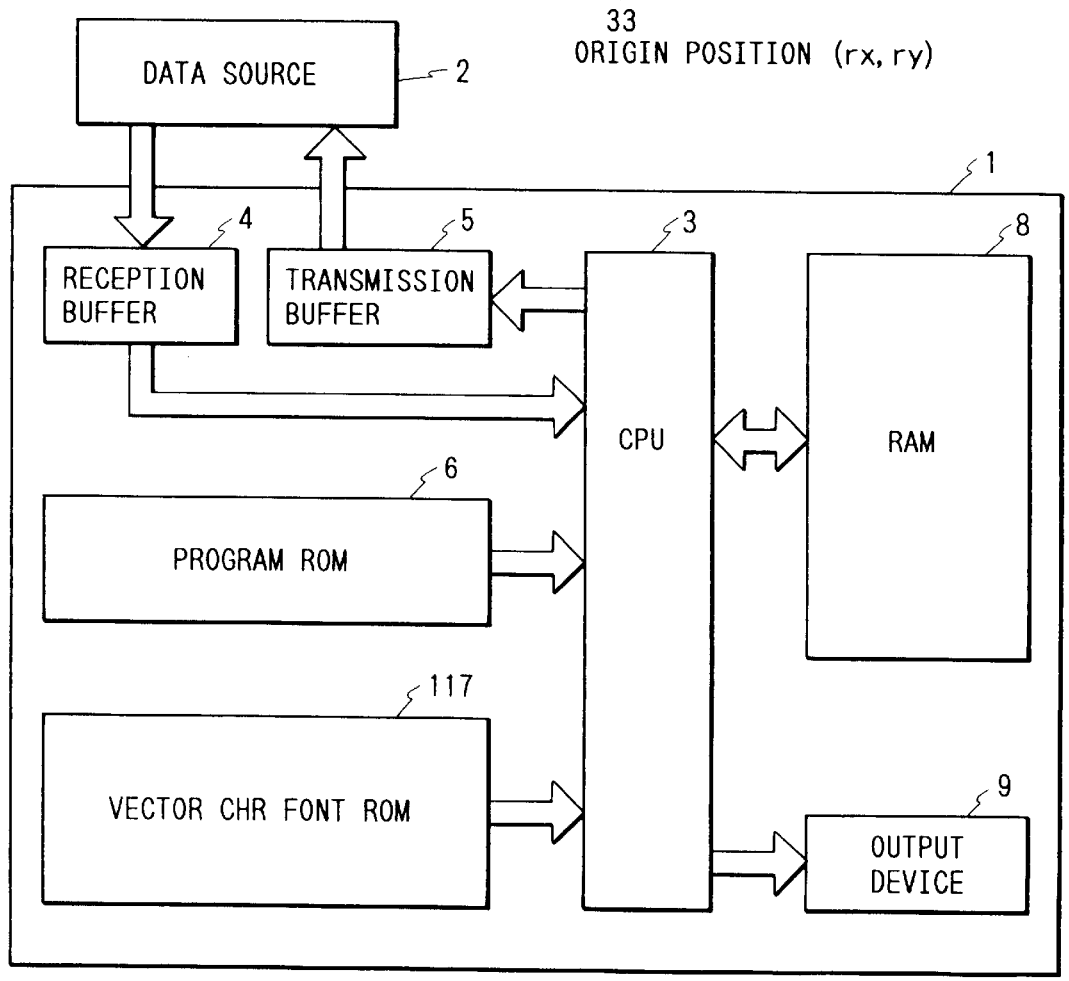
FIG. 5 is a block diagram of another embodiment of the present invention.
Figure 7:
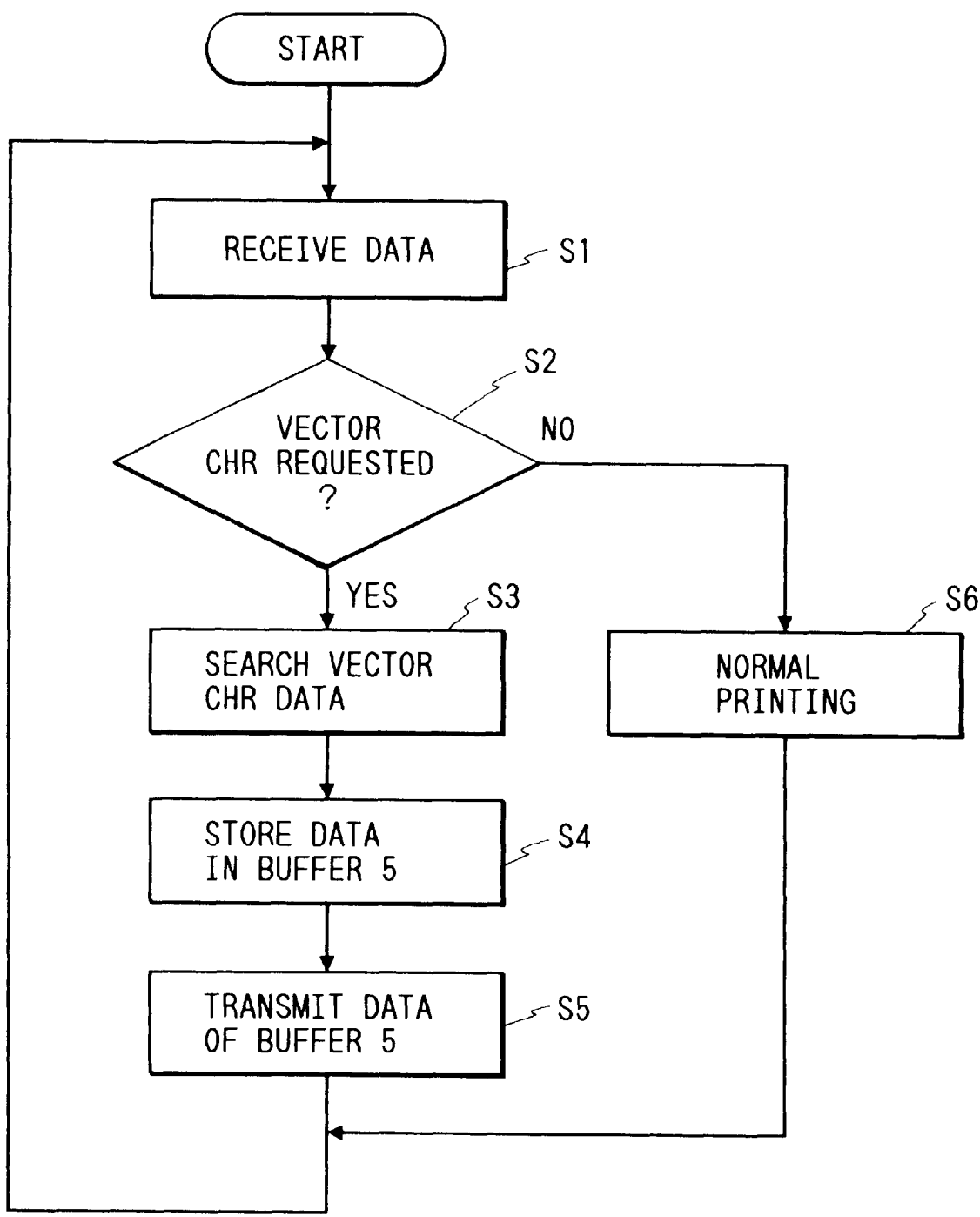
FIG. 7 is a flow chart showing the control sequence said another embodiment.

FIG. 5 is a view best representing the features of the present invention, wherein shown are a main body 1 of the printing apparatus; a data source 2 such as an external host computer; a CPU 3 for controlling all the units in the main body 1; a reception buffer 4 for storing the data transmitted from the data source 2; a transmission buffer 5 for storing data to be transmitted from the printing apparatus 1 to the data source 2; a program ROM 6 for storing programs corresponding to the flow chart shown in FIG. 7, including a program for detecting vector character data of an arbitrary character code from the vector character font and a program for determining the number of bytes of thus detected vector character data; a vector character font ROM 117 storing the data of vector character (data required for generating a bit map character patterns of an arbitrary size, such as vector character pattern, amount of character movement, original point of character etc.) corresponding to the character code entered into the reception buffer 4; a RAM 8 used as a work area in the program execution of the CPU 3; and an output unit 9 for printing the print data stored in the RAM 80

Figure 6:
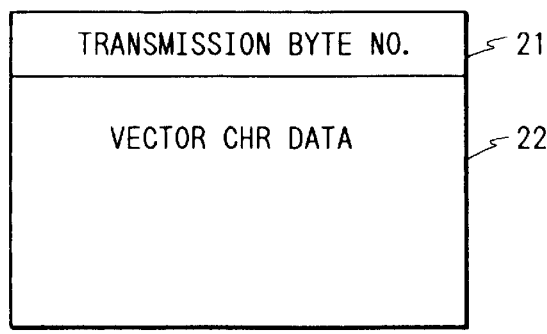
FIG. 6 is a view showing the format of vector data for transmission to the data source.

FIG. 6 shows the format of the vector character data used in the transmission from the printing apparatus to the data source 2, and in the storage in the transmission buffer 5. In FIG. 6, an area 21 indicates the number of bytes of the data to be transmitted to the data sources and is followed by vector character data 22 of said number of bytes. This data transmission format is determined in advance between the printing apparatus and the data source.

FIG. 7 is a flow chart of the control sequence of the printing apparatus constituting an application of the present embodiment. In the following there will be explained the function of the present embodiment, with reference to said flow chart.

When the power supply to the present apparatus is started, a step S1 receives the data from the data source 2, stores the received data in the reception buffer 4 and reads data of a unit code from said reception buffer. Then a step S2 discriminates whether said data are a vector character data requesting instruction, and, if so, a step S3 receives a character code from the reception buffer 4 and detects corresponding vector character data from the vector character font ROM 7. A step S4 determines the number of bytes of thus detected vector character data, and stores said number and said vector character data in the transmission buffer 5. Subsequently a step S5 executes the transmission of the data stored in the transmission buffer 5 to the data source, and the sequence returns to the step S1. It is also possible, among the data to be transmitted from the data source, to transmit the vector character data of the data source in collective or successive manner.

On the other hand, if the discrimination of the step S2 turns out negatives a step S6 executes ordinary process of the printing apparatus (such as character printing, line feed or form feed) and the sequence returns to the step S1.

(Other embodiments)

Though the foregoing description has been limited to a printing apparatus such as a page printer, the present embodiment is easily applicable to any character display apparatus provided with a bidirectional communication channel and capable of displaying characters with a bit map character font, including such display as cathode ray tube.

(Embodiment of generating, from a vector character font, a bit map character pattern of a resolution and a character size requested by the data source and transmitting said pattern to the data source)

Figure 8:
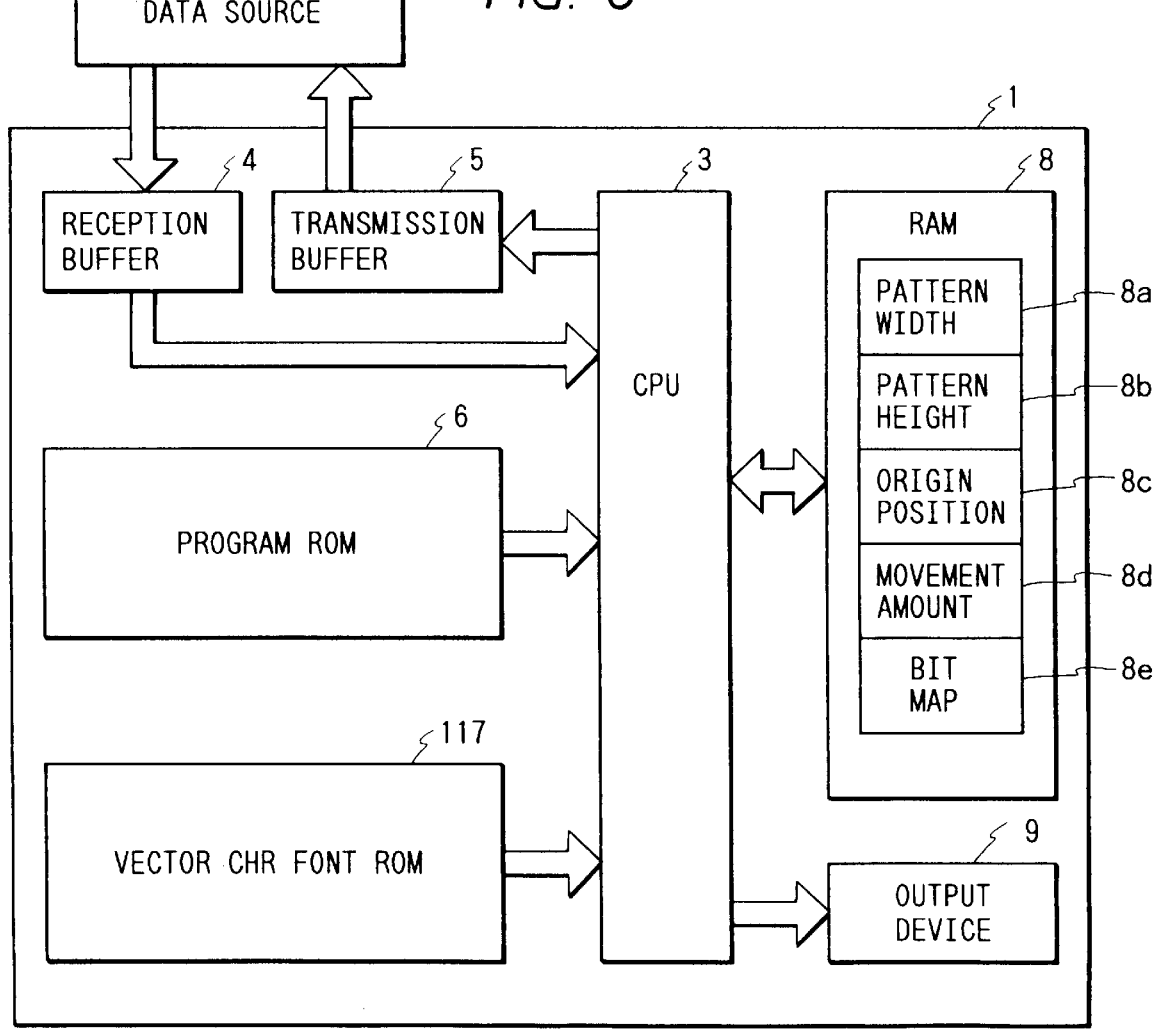
FIG. 8 is a block diagram of still another embodiment of the present invention.
Figure 9:
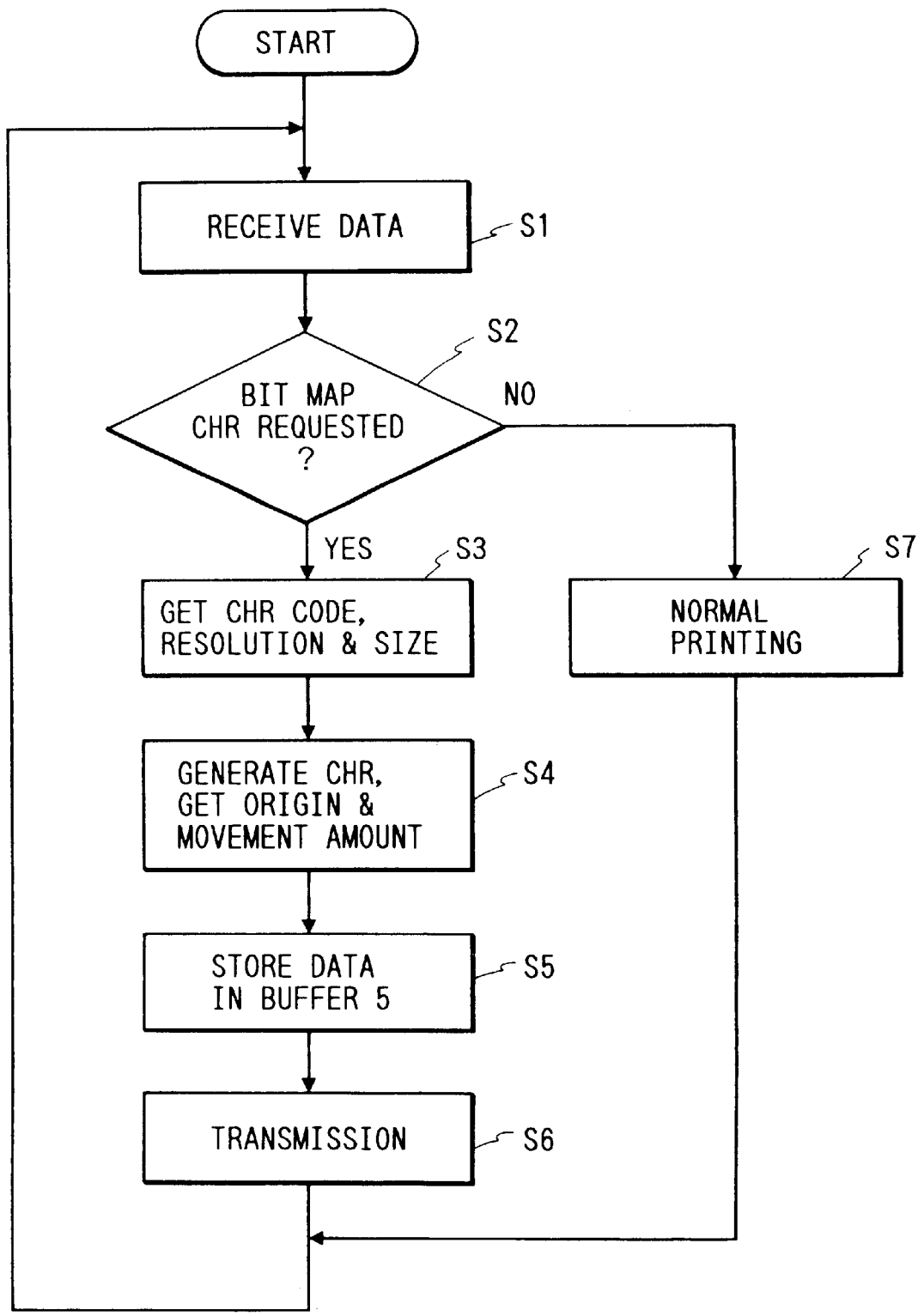
FIG. 9 is a flow chart of the control sequence of said still another embodiment.

FIG. 8 is a view best showing the features of the present embodiment, wherein shown are a main body 1 of the printing apparatus; a data source 2 such as an external host computer; a CPU 3 for controlling all the units in the pringing apparatus 1; a reception buffer 4 for storing the data to be transmitted from the data source 2; a transmission buffer 5 for storing the data to be transmitted from the printing apparatus 1 to the data source 2; a program ROM 6 for storing programs corresponding to the flow chart shown in FIG. 9, including a program for generating a bit map character pattern of an arbitrary size from the vector character font, and a program for determining the original point, amount of character movement etc. at that moment; and a vector character font 117 storing the vector character pattern, basic/original point of the character, basic/amount of character movement etc. corresponding to the character code entered into the reception buffer 4 (the original point of the character at the selected character size is determined by the calculation from the designated character size and the basic original point of the characters and the amount of character movement at said character size is determined from the calculation with the basic amount of movement) A RAM 8 is used as a work area in the program execution of the CPU 3, and is provided, as memory areas for the data to be transmitted to the data source 2, with a pattern width memory area 8a for storing the width of the bit map pattern; a pattern height memory area 8b for storing the height of said pattern; an original point memory area 8c for storing the original point of the character; a movement amount memory area 8d for storing the amount of character movement; and a bit map area 8e for storing the bit map character pattern. An output unit 9 serves to print the print data stored in the RAM 8.

FIG. 9 is a flow chart showing the control sequence of a printing apparatus constituting an application of the present embodiment. In the following there will be explained the function of the present embodiment, with reference to said flow chart.

When the power supply to the apparatus is started, a step S1 receives the data from the data source 2, stores the received data in the reception buffer. Then a step S2 discriminates whether said data are an instruction requesting the output of a bit map character by the development of a vector character, and, if so, a step S3 further receives data of character code, resolution and character size from the reception buffer 4. Then a step S3 searches a vector character pattern corresponding to the received character code from the vector character font ROM 7, generates a bit map character pattern of the resolution (for example R=400 dpi) and the character size received in the step S3, and stores said pattern in the bit map area 8e. Also the width and height of said bit map character pattern are stored respectively in the pattern width memory area 8a and the pattern height memory area 8b. Furthermore the original point of the character and the amount of character movement are determined and stored respectively in the original point memory area 8c and the movement amount memory area 8d. A next step S5 stores data, stored in the RAM 8, in the transmission buffer 5 according to the transmission format shown in FIG. 3A, then a step S6 transmits the data from the transmission buffer 5 to the data source 2, and the sequence returns to the step S1.

On the other hand, if the discrimination of the step S2 turns out negative, a step S7 executes normal processing of the printing apparatus (such as character printing, line feeding or form feeding), and the sequence returns to the step S1.

Though the foregoing description has been limited to a printing apparatus such as a page printer, the present embodiment is easily applicable to any character display apparatus provided with a bidirectional communication channel and capable of displaying characters with a bit map character font, including such display as a cathode ray tube.

As explained in the foregoing, an output apparatus equipped with vector character fonts is given a function of searching vector character data corresponding to a character code requested from the host apparatus and sending said data to the host apparatus, whereby the host apparatus can handle vector characters, not provided in the host apparatus, through supply from the output apparatus.

Also as explained in the foregoing, a character output apparatus for displaying characters of an arbitrary size by means of vector character fonts is given a function of generating a characters represented by bit map data, of a resolution and a character size requested by the host apparatus and transmitting said data to the host apparatus, whereby characters of a data source can be processed even by entirely different apparatus.

What is claimed is:

1. An output apparatus for executing information output based on information received from a data source through a bi-directional communication channel, said output apparatus comprising:

memory means for storing bit map character fonts and corresponding distance information indicating a distance from the bit map character fonts to the origin of a next character for generating output information;

discrimination means for discriminating whether a character request command is received from the data source via the bi-directional communication channel;

selection means for selecting one of the bit map character fonts and corresponding distance information stored in said memory means in response to a code received from the data source via the bi-directional communication channel if said discrimination means discriminates that the character request command is received; and transmission means for transmitting one of the bit map character fonts and corresponding distance information selected by said selection means to the data source according to a format corresponding to the information received from the data source such that output information is generated in the data source.

2. A data processing apparatus for communicating with a data source via a bi-directional communication channel, said apparatus comprising:

discrimination means for discriminating whether a character request command is received from the data source via the bi-directional communicating channel;

selection means for selecting data from a memory in response to a code received from the data source via the bi-directional communication channel if said discrimination means discriminates that the character request command is received;

calculation means for calculating an amount of the data selected by said selection means; and transmission means for transmitting the data amount calculated by said calculation means and the data selected by said selection means to the data source via the bi-directional communication channel such that the transmitted data is processed in the data source.

3. An apparatus according to claim 2, wherein the data comprises non-dot font data.

4. An apparatus according to claim 3, wherein the non-dot font data comprises outline font data.

5. An apparatus according to claim 3, wherein the non-dot font data comprises vector font data.

6. An apparatus according to claim 2, wherein the data source includes a host computer.

7. An apparatus according to claim 2, further comprising a printer for printing the data.

8. A storage medium for storing a program executed in a data processing apparatus which communicates with a data source via a bi-directional communication channel, with the program comprising the steps of:

discriminating whether a character request command is received from the data source via the bi-directional communication channel;

selecting data from a memory in response to a code received from the data source via the bi-directional communication channel if said discriminating step discriminates that the character request command is received;

calculating an amount of the selected data; and transmitting the calculated data amount and the selected data to the data source via the bi-directional communication channel such that the transmitted data is processed in the data source.

9. A medium according to claim 8, wherein the data comprises non-dot font data.

10. A medium according to claim 9, wherein the non-dot font data comprises outline font data.

11. A medium according to claim 9, wherein the non-dot font data comprises vector font data.

12. A medium according to claim 8, wherein the data source includes a host computer.

13. A medium according to claim 8, wherein the data processing apparatus includes a printer.

14. A method carried out in a data processing apparatus which communicates with a data source via a bi-directional communication channel, comprising the steps of:

discriminating whether a character request command is received from the data source via the bi-directional communication channel;

selecting data from a memory in response to a code received from the data source via the bi-directional communication channel if said discriminating step discriminates that the character request command is received;

calculating an amount of the selected data; and transmitting the calculated data amount and the selected data to the data source via the bi-directional communication channel such that the transmitted data is processed in the data source.

15. A method according to claim 14, wherein the data comprises non-dot font data.

16. A method according to claim 15, wherein the non-dot font data comprises outline font data.

17. A method according to claim 15, wherein the non-dot font data comprises vector font data.

18. A method according to claim 14, wherein the data source comprises a host computer.

19. A method according to claim 14, wherein the data processing apparatus includes a printer for printing the data.

20. A print control apparatus which communicates with an information processing apparatus via bi-directional communication means, said print control apparatus comprising:

determination means for determining whether request instruction information that instructs request for certain data has been received from the information processing apparatus;

search means for searching data instructed by the request instruction information if said determination means determines that the request information has been received;

transmission means for transmitting the data searched by said search means and information indicating the amount and position of the searched data to the information processing apparatus via the bi-directional communication means; and print control means for controlling a printing operation based on data received from the information processing apparatus if said determining means determines that the request information has not been received.

21. A print control apparatus according to claim 20, wherein said transmission means transmits not-dot data searched by said search means and the number of bytes of the non-dot data to the information processing apparatus.

22. An print control apparatus according to claim 20, wherein said transmission means transmits dot data searched by said search means and information indicating the width and height of the dot data to the information processing apparatus.

23. A print control apparatus according to claim 20, wherein said transmission means modifies the searched data and transmits the modified data to the information processing apparatus.

24. A print control apparatus according to claim 23, wherein said transmission means transmits the searched data to the information processing apparatus in a resolution requested by the information processing apparatus.

25. A print control apparatus according to claim 23, wherein said transmission means transmits the search data to the information processing apparatus in a size requested by the information processing apparatus.

26. A print control apparatus according to claim 23, wherein said transmission means converts non-dot data searched by said search means to dot data and transmits the converted dot data to the information processing apparatus.

27. A print control method for operating a control apparatus in communication with an information processing apparatus via bi-directional communication means, said method comprising the steps of:

determining whether request instruction information that instructs request for certain data has been received from the information processing apparatus;

searching data instructed by the request instruction information if it is determined that the request information has been received;

transmitting the searched data and information indicating the amount and position of the searched data to the information processing apparatus via the bi-directional communication means; and controlling a printing operation based on data received from the information processing apparatus if it is determined that the request information has not been received.

28. A method according to claim 27, further comprising the step of transmitting searched non-dot data and the number of bytes of the non-dot data to the information processing apparatus.

29. A method according to claim 27, further comprising the step of transmitting searched dot data and information indicating the width and height of the dot data to the information processing apparatus.

30. A method according to claim 27, further comprising the step of modifying the searched data and transmitting the modified data to the information processing apparatus.

31. A method according to claim 30, further comprising the step of transmitting the searched data to the information processing apparatus in a resolution requested by the information processing apparatus.

32. A method according to claim 30, further comprising the step of transmitting the searched data to the information processing apparatus in a size requested by the information processing apparatus.

33. A method according to claim 30, further comprising the step of converting searched non-dot data to dot data and transmitting the converted dot data to the information processing apparatus.

34. A computer-readable memory encoded with a data structure for operating a print control apparatus in communication with an information processing apparatus via bi-directional communication means, the print control apparatus being operated to perform the steps of:

determining whether request instruction information that instructs request for certain data has been received from the information processing apparatus;

searching data instructed by the request instruction information if it is determined that the request information has been received;

transmitting the searched data and information indicating the amount and position of the searched data to the information processing apparatus via the bi-directional communication means; and controlling a printing operation based on data received from the information processing apparatus if it is determined that the request information has not been received.

35. A method according to claim 34, further comprising the step of transmitting searched non-dot data and the number of bytes of the non-dot data to the information processing apparatus.

36. A method according to claim 34, further comprising the step of transmitting searched dot data and information indicating the width and height of the dot data to the information processing apparatus.

37. A method according to claim 34, further comprising the step of modifying the searched data and transmitting the modified data to the information processing apparatus.

38. A method according to claim 37, further comprising the step of transmitting the searched data to the information processing apparatus in a resolution requested by the information processing apparatus.

39. A method according to claim 37, further comprising the step of transmitting the searched data to the information processing apparatus in a size requested by the information processing apparatus.

40. A method according to claim 37, further comprising the step of converting searched non-dot data to dot data and transmitting the converted dot data to the information processing apparatus.

41. A computer program embodied in a computer memory for operating a print control apparatus in communication with an information processing apparatus via bi-directional communication means, said print control apparatus controlled by the computer program to perform the steps of:

determining whether request instruction information that instructs request for certain data has been received from the information processing apparatus;

searching data instructed by the request instruction information if it is determined that the request information has been received;

transmitting the searched data and information indicating the amount and position of the searched data to the information processing apparatus via the bi-directional communication means; and controlling a printing operation based on data received from the information processing apparatus if it is determined that the request information has not been received.

42. A computer program for operating the print control apparatus according to claim 41, wherein the searched non-dot data and the number of bytes of the non-dot data are transmitted to the information processing apparatus.

43. A computer program for operating the print control apparatus according to claim 41, wherein the searched dot data and information indicating the width and height of the dot data are transmitted to the information processing apparatus.

44. A computer program for operating the print control apparatus according to claim 41, wherein the searched data is modified and transmitted to the information processing apparatus.

45. A computer program for operating the print control apparatus according to claim 44, wherein the searched data is transmitted to the information processing apparatus in a resolution requested by the information processing apparatus.

46. A computer program for operating the print control apparatus according to claim 44, wherein the searched data is transmitted to the information processing apparatus in a size requested by the information processing apparatus.

47. A computer program for operating the print control apparatus according to claim 44, wherein the searched non-dot data is converted to dot data and transmitted to the information processing apparatus.

* * * * *

UNITED STATES PATENT AND TRADEMARK OFFICE
CERTIFICATE OF CORRECTION

PATENT NO. : 5,917,507

DATED : June 29, 1999

INVENTOR(S) : Sakurai

It is certified that error appears in the above-identified patent and that said Letters Patent is hereby corrected as shown below:

On the title page: Item [54] and Column 1, line 3,

TITLE:

"FOR" should read --FROM--.

COLUMN 4:

Line 48, "RAM 80" should read --RAM 8--.

COLUMN 5:

Line 31, "pringing" should read --printing--.

COLUMN 6:

Line 43, "characters" should read --character--, and "data," should read --data--.

Signed and Sealed this

Twenty-ninth Day of February, 2000

Attest:

Q. TODD DICKINSON

*Attesting Officer*     *Commissioner of Patents and Trademarks*